(12) United States Patent
Swanson

(10) Patent No.: US 11,526,643 B1
(45) Date of Patent: Dec. 13, 2022

(54) ENUMERATING COVERAGE BASED ON AN ARCHITECTURAL SPECIFICATION

(71) Applicant: Amazon Technologies, Inc., Seattle, WA (US)

(72) Inventor: Todd Swanson, Pflugerville, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/301,184

(22) Filed: Mar. 29, 2021

(51) Int. Cl.
*G06F 30/3323* (2020.01)
*G06F 111/04* (2020.01)

(52) U.S. Cl.
CPC ...... *G06F 30/3323* (2020.01); *G06F 2111/04* (2020.01)

(58) Field of Classification Search
USPC .......................................................... 716/106
See application file for complete search history.

(56) References Cited

U.S. PATENT DOCUMENTS

| | | | | |
|---|---|---|---|---|
| 8,560,985 B1* | 10/2013 | Sahu | ...................... | G06F 30/33 716/106 |
| 10,586,014 B1* | 3/2020 | Kinderman | ........... | G06F 30/398 |
| 2004/0078674 A1* | 4/2004 | Raimi | ................. | G06F 30/3323 714/33 |
| 2014/0156572 A1* | 6/2014 | Katz | ..................... | G06F 11/261 706/20 |
| 2021/0264085 A1* | 8/2021 | Green | ................. | G06F 30/3323 |
| 2022/0058668 A1* | 2/2022 | Wang | ..................... | G06Q 10/04 |

* cited by examiner

Primary Examiner — Mohammed Alam
(74) *Attorney, Agent, or Firm* — Weaver Austin Villeneuve & Sampson LLP

(57) ABSTRACT

Formal verification methods are used to solve a valid model of a design-under-test (DUT) to enumerate valid coverage points based on an architectural specification of the DUT. A formal solver can be queried to solve for valid solutions by crossing one or more fields of a variable. After each valid solve, values of the variable fields can be recorded and a count for number of valid solutions can be incremented. A new rule can be added to the solving process after each valid solve to invalidate the recorded values of the variable fields for subsequent solves. The count for the number of valid solutions can provide a running total of the valid solutions found for the query. Results of the query can be processed to convert the recorded values to provide the enumerated coverage points. The enumerated coverage points can be converted to test cases for running simulations on the DUT.

16 Claims, 7 Drawing Sheets

| | Operand1 402 | Operand2 404 | Operand3 406 | Opcode 408 | Flag1 410 | Flag2 412 | Condition 414 |
|---|---|---|---|---|---|---|---|
| 400a | X | X | X | 110101 | X | 1 | 000000 |
| 400b | X | X | X | 111100 | X | 0 | 010101 |
| 400c | X | X | X | 000111 | 1 | X | X |
| 400d | X | X | X | 101011 | X | 1 | 000000 |
| 400e | X | X | X | 010110 | 1 | 0 | 100010 |
| ... | ... | ... | ... | ... | ... | ... | ... |
| 400n | X | X | X | 100010 | 0 | 0 | 000001 |

FIG. 4

ENUMERATING COVERAGE BASED ON AN ARCHITECTURAL SPECIFICATION

BACKGROUND

Design verification is an essential step in the product development process for integrated circuits. Design verification may involve various techniques including simulation, functional verification, or formal verification to verify that a system behaves as intended. Simulation can include testing a design against various stimuli and comparing the output with the expected results. Functional verification can be used to uncover potential errors in the design or architecture of the system using behavior modeling or testbenches. Formal verification may generally rely on model checking techniques to prove or disprove correctness of a system using mathematical models based on a formal specification. Formal verification has applications in various fields, e.g., artificial intelligence, cryptography, digital circuits, among others. Design verification coverage is a metric that can be used to determine the extent of the design or specification that has been explored by a stimulus presented to the system.

BRIEF DESCRIPTION OF THE DRAWINGS

Various embodiments in accordance with the present disclosure will be described with reference to the drawings, in which:

FIG. 4 illustrates example fields for an instruction, which can be used to describe certain embodiments;

DETAILED DESCRIPTION

Figure 1:
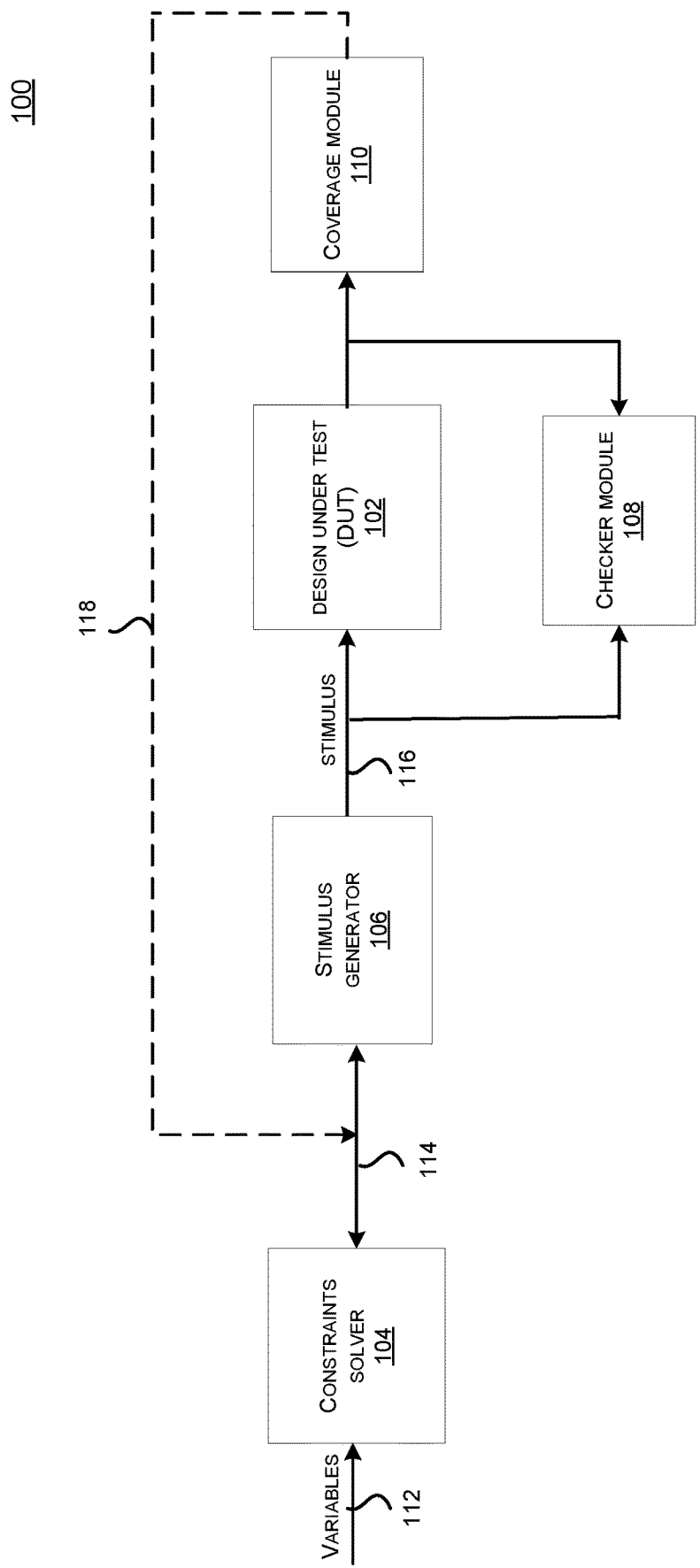
FIG. 1 illustrates a conventional process flow, which can be used to perform design verification of a design-under-test (DUT)

Formal verification methods have been gaining popularity due to their ability to perform exhaustive proof through rigorous logic reasoning, which can alleviate the need to have an elaborate functional coverage definition as is generally the case for simulation-based verification. Formal verification techniques may primarily rely on Boolean satisfiability (SAT) or binary decision diagrams (BDDs) to perform model checking using formal solvers such as SAT solvers or Satisfiability Module Theories (SMT) solvers. Boolean satisfiability (SAT) is the problem of determining whether there exists an assignment of values to a set of variables that satisfies a given Boolean formula. The given Boolean formula can be valid when its complement cannot be satisfied. Each variable can have a set of possible values in a solution space. Formal verification models based on Boolean satisfiability (e.g., SAT solvers) can solve rules to produce valid (or legal) solutions in the solution space. Rules can be expressed as symbolic Boolean equations of the set of variables. The SAT solvers (e.g., constraints solvers, or formal solvers) can support declarative representation of the rules. Declarative representation can allow rules that are separable, such that an intersection of all the valid rules can result in a valid solution space.

Design verification based on constrained methodology can allow defining rules as constraints for generating test cases for functional verification of a design-under-test (DUT). Functional verification techniques generally rely on high-level verification languages (HVL) and test-bench automation (TBA) tools. As an example, a constrained testbench can interface with a testbench or verification environment, such as SystemVerilog®, to generate the test cases. The constraints can be defined as the HVL constructs. Generally, a constraints solver generates a random sampling of the solutions in a valid solution space. There may be a finite number of solutions (or test cases) that can be generated for a collection of rules. In some examples, the valid solution space may be too large. For example, for a 64-bits variable, $2^{64}$ possible combinations can be enumerated. In some instances, the rules can be biased slightly to steer the solver process manually to cover different areas of the design; however, the constraints solver cannot predict how many valid solutions exist, or when it is done generating the solutions. In some examples, the same solution may be generated more than once. However, certain verification environments cannot support updating the constraints in real time to steer the solutions since it may require recompilation of the formal model.

Coverage metrics can be used to determine the extent of the design that has been explored by the stimulus presented to the design. Exhaustive coverage may indicate that the design has been exercised for all valid solutions, and sparse coverage may indicate that the coverage is incomplete. In conventional flows, the stimulus that is used to verify validity of the architectural specification does not provide coverage points for the design. Generally, the stimulus and the coverage points are produced using separate flows or tools. The coverage generation is typically a manual process, which can be error prone, and can cause duplication of efforts. In most instances, determining a count of the valid coverage points, or whether a coverage list is exhaustive or sparse can be a difficult task. For example, a constraints solver is typically used to generate the stimulus and cannot be used to provide a count of the coverage points or whether exhaustive coverage exists for the DUT. In most instances, the stimulus is injected into the DUT in a simulation environment and the outputs of the DUT are compared against the expected outputs for the functional verification of the DUT. The simulation results can be analyzed to extract the coverage information. Based on the coverage information, the stimulus can be modified, or new test cases can be added to fill the coverage gaps. Thus, in most systems, achieving exhaustive coverage for the DUT can require manual intervention and can be a time-consuming process. Additionally, having independent flows for the simulation and the coverage generation may require additional time and resources.

Embodiments of the disclosed technologies can use formal methods to provide enumerated valid coverage points for a DUT based on the architectural specification of the design. A formal solver can be used to generate different solutions iteratively or provide a proof when no more solutions are available. Certain embodiments can support querying a formal solver to solve a formal model to count the number of valid coverage points for the DUT based on certain rules. A valid solve of the formal model may return a valid solution belonging to a valid solution space of the DUT. If a solution does not exist, a proof may be provided. The DUT can be a component or a module of a larger design or a system. The formal model may include a state space model comprising valid and invalid states of the design to test certain features of the DUT. The rules may include symbolic Boolean equations of a set of variables associated with the DUT based on the architectural specification of the DUT.

The query can indicate which variables to cross to solve for one or more valid solutions in the valid solution space associated with the DUT. Each valid solution may correspond to a respective combination of the variables that satisfies the rules. After each valid solve, a count for the number of valid solutions can be incremented, and the solved values of the crossed variables can be recorded. The formal model can be updated to include a new rule to invalidate the recorded values of the solution so that subsequent solves of the query result in different solutions. The solve process can be repeated until an exhaustive proof is obtained or the query is terminated. The exhaustive proof may indicate that no other permutations of the crossed variables exist which can produce another valid solution. In certain embodiments, the query can be terminated before the exhaustive proof is found and the solve process can be executed again with different variables to achieve sparse or different coverage.

The count for the number of valid solutions can provide a running total of the valid solutions found. In certain embodiments, if the count is more than a threshold value, the query can be terminated. For example, the query may take a long time if the crossed variables result in a large number of combinations. In such cases, the query can be terminated, and a new query with fewer combinations of the variables can be started. Enumerating all combinations of the valid solutions can allow creating test cases or stimulus for the design verification of the DUT. Enumerating may imply listing, counting, totaling, or similar. For example, the recorded values can be exported to a verification environment, such as SystemVerilog®, to generate test cases, which can be used to determine if enough simulation has been performed on the DUT. Additionally, all the recorded values can be converted to individual coverage bins. The coverage bins can be the enumerated coverage points that represent the exhaustive coverage of the query. Thus, the embodiments can provide enumerated coverage points representing exhaustive coverage of certain features of the DUT based on the architectural specification of the DUT. In various embodiments, a request to query can be provided using a user interface or can be generated automatically. In certain examples, the query can be generated automatically using a machine learning (ML) interface based on certain heuristics, or another criteria to control the coverage points in order to steer the stimulus for testing certain aspects of the design.

In certain embodiments, the formal solver can be used to solve a formally specified instruction model of an instruction generator to generate valid instructions, which can be used to perform functional verification of a processor. The formally specified instruction model can be solved to generate valid instructions in an instruction space based on the architectural specification of the processor. For example, the formally specified instruction model may include mathematical equations that represent all valid and invalid variations for an instruction set of the processor. A user can query the formal instruction model to solve for a valid instruction by crossing one or more instruction fields. The formal instruction model can be used to solve for all possible valid instructions in the instruction space iteratively by adding rules after every valid solve until an exhaustive proof is found. A counter can be incremented after each valid solve to enumerate the valid coverage points for the processor. The enumerated coverage points can provide an exhaustive list of all the valid instructions that can be used as stimulus to test the behavior of the processor. In certain examples, the exhaustive proof may include verifying a certain sequence (or another property) for a group of instructions by defining rules in the formal instruction model to specify the ordering of the instructions in the group.

In certain embodiments, the valid solutions or coverage points can be rolled into a table and exposed to other flows that may need to determine whether a particular solution has been exercised or not. As an example, it may be desirable to determine that a compiler is exercising the same coverage points that have been enumerated to generate all the valid instructions. The enumerated coverage points can be exported to a suitable format to determine whether all the valid instructions have been generated by the compiler. Thus, the embodiments can use an iterative algorithm to allow generating the stimulus using the same set of rules that are used to generate the coverage points.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates a conventional process flow 100, which can be used to perform design verification of a design-under-test (DUT). The DUT can be a hardware system, a software system or a combination thereof.

The process flow 100 can be used to perform functional verification of a DUT 102 using a testbench or verification environment such as SystemVerilog®. The test bench can allow specifying constraints on one or more variables 112 associated with the DUT 102 to generate random solutions 114 using a constraints solver 104. Each variable can have a finite set of possible values based on the specification of the DUT 102. A constraint can be expressed as a relationship between a set of the variables 112 which represents a valid combination of their values. The constraints solver 104 can solve for random solutions within a valid solution space based on the constraints. Each of the solutions 114 may represent an assignment of a value to each of the variables which can satisfy all the constraints.

A stimulus generator 106 can be used to generate stimulus 116 based on the solutions 114 for testing the DUT 102. The constraints can provide restrictions on the stimulus values. The stimulus generator 106 can provide the stimulus 116 to the DUT 102 and a checker module 108. The DUT 102 can be an integrated circuit, a system-on-chip (SoC), a software module, a component of the SOC, or any system comprising hardware and/or software components. The checker module 108 may include a high-level implementation of the DUT 102 based on the architectural specification of the DUT 102. In certain examples, the checker module 108 can include a behavioral model of the DUT 102. The stimulus 116 can drive the inputs of the DUT 102 and the checker module 108 in a simulation environment. The simulation outputs from the DUT 102 can be compared against the expected outputs defined in the checker module 108 to determine whether the DUT 102 is behaving as expected. A coverage module 110 can be used to provide functional coverage points by measuring which design features have been exercised by the stimulus based on the simulation results. A functional coverage point can map to a functionality that has been tested based on a test plan. As different functionalities to be tested are hit in the simulation, the functional coverage points can be updated. Thus, the stimulus generation and the coverage points generation are generally performed using separate flows in the conventional methods utilizing the constraints solver 104.

The constraints solver 104 can be used to produce a large set of valid solutions randomly based on the variables 112. The variables 112 can have a finite set of values; however, for a variable with large number of possible values (e.g., $2^{64}$ possible values for a 64-bits variable), the solution space can be enormous due to large number of possible valid solutions. The constraints solver 104 can generally solve for most of the solutions; however, the constraints solver 104 cannot indicate when it is done solving for all possible solutions in the valid solution space. In certain examples, the constraints solver 104 may produce the same solution more than once. Thus, due to the holes in the solution space, the stimulus applied to the DUT 102 may not provide exhaustive coverage. In certain examples, as shown by a dotted line 118, results of the simulation and the coverage points can be analyzed manually, and the constraints of the constraints solver 104 can be modified to generate another set of random solutions 114. This process can be repeated with different random seeds to minimize coverage gaps. In certain instances, directed test cases can be applied manually to fill the coverage gaps. However, exhaustive coverage may not be reached using the constraints solver 104.

As discussed with reference to FIG. 1, the constraints solver 104 can solve for different random solutions but cannot provide a proof of exhaustive coverage. The stimulus provided by the stimulus generator 106 is generally not used to generate the coverage points. In most instances, the coverage points generated by the coverage module 110 are extracted from the results of the simulation. Having separate flows for the stimulus generation and the coverage points generation, as discussed with reference to the process flow 100, may consume additional computing resources and result in a longer design verification cycle. Embodiments of the disclosed technologies can provide an iterative algorithm to generate the stimulus as well as the exhaustive coverage points using the same flow, as discussed with reference to FIG. 2.

Figure 2:
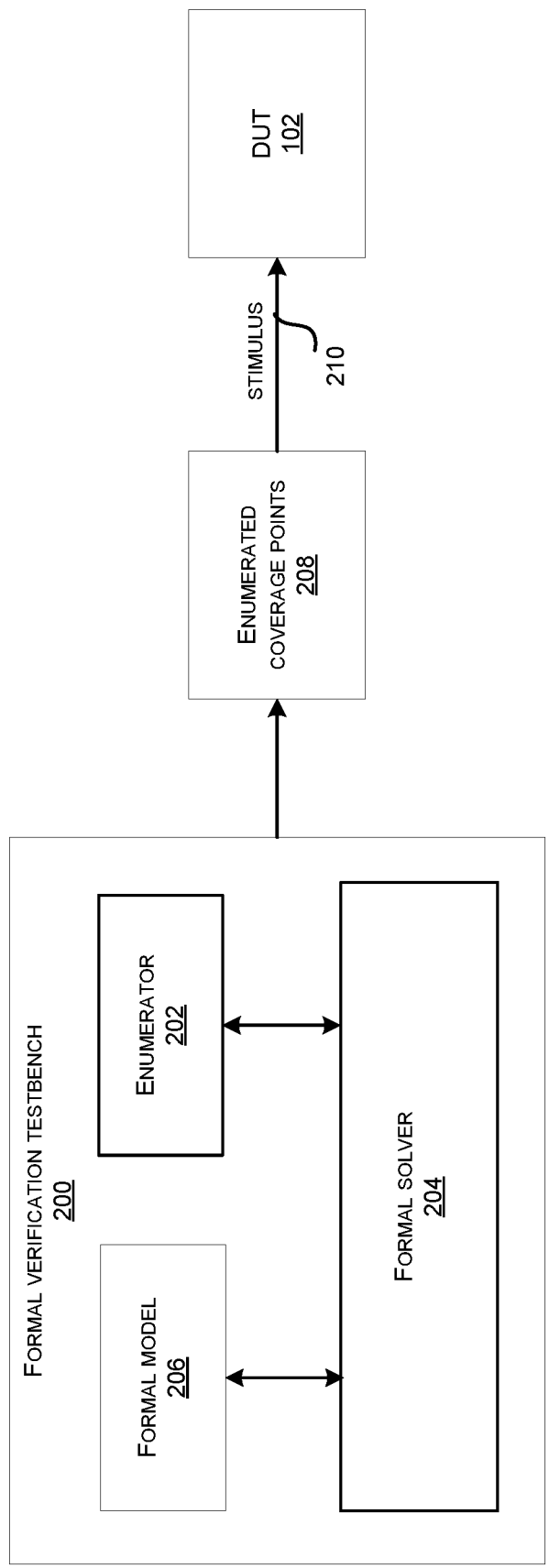
FIG. 2 illustrates a formal verification testbench that can be used to provide enumerated valid coverage points for the DUT using an enumerator, in certain embodiments.

FIG. 2 illustrates a formal verification testbench 200 that can used to provide enumerated valid coverage points for a DUT using an enumerator, in certain embodiments.

In certain examples, the formal verification testbench 200 can provide the verification environment for an enumerator 202 to interact with a formal solver 204 to provide the enumerated valid coverage points for the DUT 102. As an example, functionality of the enumerator 202 can be embedded in the formal verification testbench 200 to interact with the formal solver 204. The formal solver 204 may be capable to solve a formal model 206 to generate one or more valid solutions in a solution space of the DUT 102. The formal model 206 may be implemented as a state space model comprising valid and invalid states to test certain features of the DUT 102. The state space model can be expressed as mathematical equations of a set of variables associated with the DUT 102 and can be implemented using any suitable modeling language. The set of variables may include inputs, outputs or internal states of the DUT 102, and can have a finite set of values based on the architectural specification of the DUT 102. The formal solver 204 may include any implementation of a formal solver without deviating from the scope of the disclosure. For example, the formal solver 204 may include an SAT solver, an SMT solver, or any formal verification tool that can perform formal verification based on model checking techniques.

The enumerator 202 can provide the formal model 206 comprising rules to the formal solver 204 for generating valid solutions in the solution space for the DUT 102 based on the set of variables. The rules may include symbolic Boolean equations of some of the variables based on the architectural specification of the DUT 102. Each valid solution may correspond to a respective combination of the variables that satisfies the rules. In certain embodiments, the enumerator 202 may receive a request to query the formal solver 204 by crossing one or more variables from the set of variables. Crossing of a single variable that includes one or more fields may imply applying all combinations of the one or more fields of the variable. Crossing of two or more variables may imply applying all the combinations of the two or more variables. The query may be received using a user interface, which may include a graphical user interface (GUI), an application programming interface (API), or another suitable interface. In certain examples, the user interface can allow a user to select a variable or fields of the variable to cross for the query. In other examples, the query can be generated automatically in a controlled environment to control the coverage points in order to steer the stimulus for testing the DUT 102.

The enumerator 202 may query the formal solver 204 to solve the formal model 206 for one or more valid solutions for all the combinations of the one or more variables. Since the formal solver 204 may only solve for one valid solution at a time, the solve process can be iteratively performed for each combination of the one or more variables until a proof is obtained. For example, querying the formal solver 204 for all the combinations of the one or more variables may include iteratively determining whether solving the formal model 206 for each combination of the one or more fields of the variable results in a respective valid solution or a proof Each combination of the variables that results in a respective valid solution can be recorded and a count for the number of valid solutions can be incremented. For each valid solve, the formal model 206 can be updated to include a new rule to invalidate the recorded values for subsequent solves of the formal model 206. Updating the formal model 206 to invalidate the recorded values for the subsequent solves can disable the generation of the same solution more than once. Hence, all the valid solutions can be distinct, thus providing exhaustive coverage.

Once all the valid solutions have been generated, the exhaustive proof can be obtained, and the results of the query can be processed. The valid solutions may represent enumerated coverage points for the DUT 102. The recorded values for all the valid solutions can be converted to individual coverage bins that may represent the exhaustive coverage of the query. In certain examples, the query can be terminated to obtain sparse coverage if the iterative solve process crosses a threshold for a time limit (e.g., 2 hours or 24 hours) or number of solves (e.g., ten thousand, a million) to obtain the exhaustive coverage. In such instances, the query can be modified to cross smaller number of variables such that an exhaustive proof can be obtained in an acceptable time duration. The recorded values for all the valid solutions or the coverage bins can be exported as enumerated coverage points 208 for the query. The enumerated coverage points 208 can be used to generate stimulus 210 to test the DUT 102 in any suitable simulation environment. For example, the enumerated coverage points 208 can be formatted based on the verification environment or tool to be used as the stimulus 210. In certain examples, the formal verification testbench 200 may support running the simulations on the DUT 102 by driving the stimulus 210. For example, the formal verification testbench 200 may support different modes to perform coverage generation, simulation, or test case generation, among others. In certain embodiments, the formal verification testbench 200 can support generating the query automatically using an ML interface.

Thus, the embodiments can be used to provide the stimulus and the enumerated coverage points using the same flow as compared to separate flows discussed with reference to FIG. 1. Additionally, the valid solutions may provide an exhaustive coverage for all valid values of the crossed variables.

Figure 3:
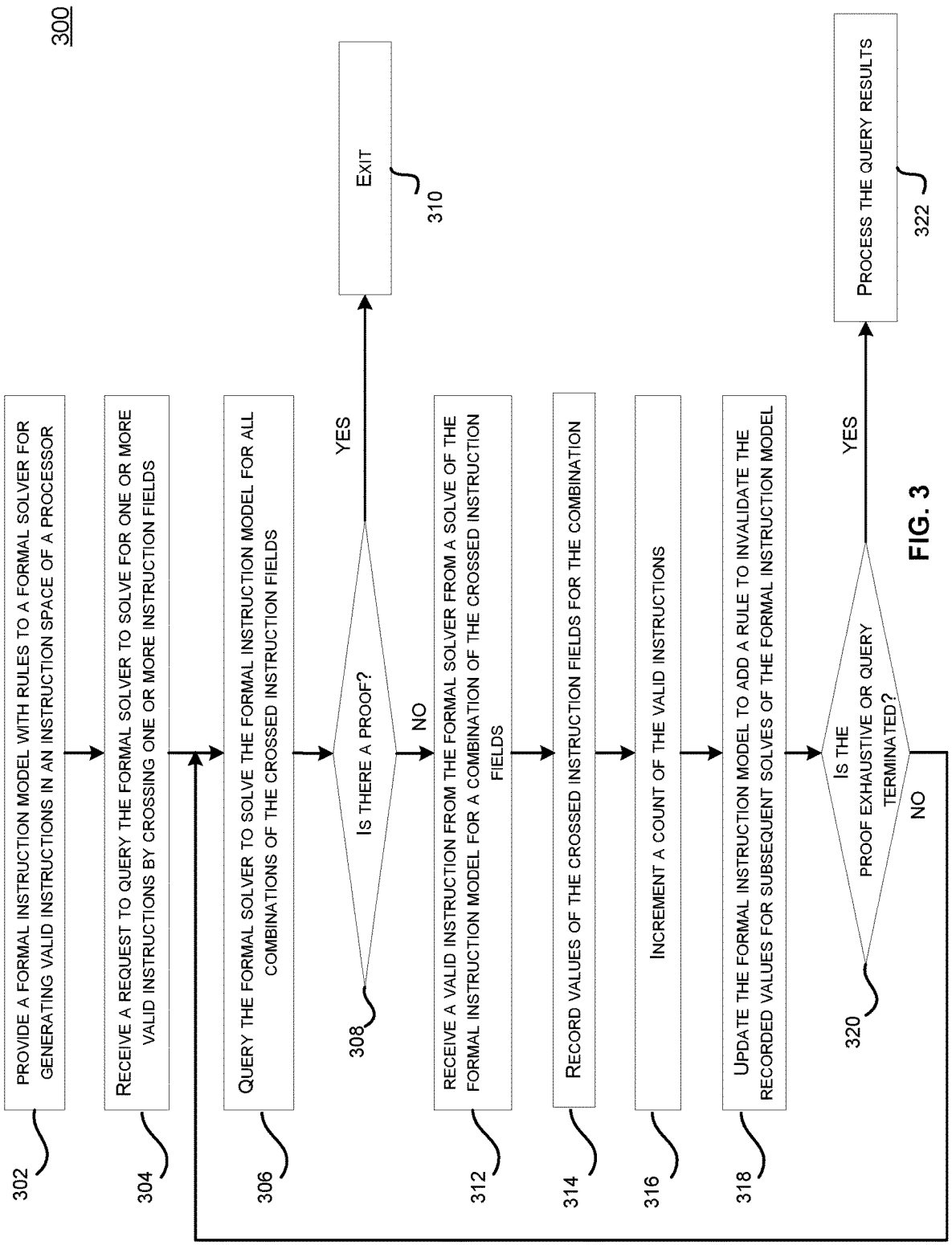
FIG. 3 illustrates a flow chart for a method to provide enumerated coverage points for design verification of a processor, according to certain embodiments.

FIG. 3 illustrates a flow chart 300 for a method to provide enumerated coverage points for design verification of a processor, according to certain embodiments.

In step 302, the method may include providing a formal instruction model with rules to a formal solver for generating valid instructions in an instruction space of the processor. As an example, the formal instruction model can be the formal model 206 and the formal solver can be the formal solver 204. The formal instruction model can be provided to the formal solver 204 by the enumerator 202 using the formal verification testbench 200. The rules may be expressed to test validity of the instructions using symbolic Boolean equations of instruction fields based on an architectural specification of the processor. The formal model 206 may be implemented as a state space model comprising mathematical equations to represent the relationships between various fields of the instructions based on an instruction-set architecture of the processor. The mathematical equations may represent all valid and invalid variations for the instruction set of the processor. Each valid instruction may correspond to a respective combination of instruction fields that satisfies the rules. An example instruction comprising different fields is described with respect to FIG. 4.

FIG. 4 illustrates example fields for an instruction 400, which can be used to describe certain embodiments. As an example, the instruction 400 may be 64-bits wide. FIG. 4 shows example instructions 400a, 400b, 400c, 400d, 400e, . . . , and 400n with different valid combinations of the fields. The example instructions 400a, 400b, 400c, 400d, 400e, . . . , and 400n may belong to an instruction space comprising N valid instructions, which may indicate that all the possible valid combinations of the fields 402-414 can provide up to N valid instructions.

The instruction 400 may include, for example, an operand1 field 402, an operand2 field 404, an operand3 field 406, an opcode field 408, a flag1 field 410, a flag2 field 412, and a condition field 414. The opcode field 408 may represent an operation to be performed on the operand1 field 402, operand2 field 404, and/or the operand3 field 406 based on the condition field 414, flag1 field 410, and/or the flag2 field 412. Some example operations may include addition, subtraction, multiplication, branch, inversion, load, store, compare, among others. The condition field 414 may be used to append the operations specified by the opcode field 408 based on the value of the flag1 field 410 or the flag2 field 412. As an example, the operand1 field 402 may be 18-bits wide, the operand2 field 404 may be 16-bits wide, and the operand3 field 406 may be 16-bits wide, and each of the operand fields may represent an offset, a memory address or a register address for a source or destination, or data to be operated on. Note that the example fields described with reference to FIG. 4 are for discussion purposes only, and the embodiments can support any type of instruction set architecture without deviating from the scope of the disclosure.

Referring back to FIG. 3, the rules in step 302 can be expressed as relationships between different fields of the instruction 400 to provide legal or valid instructions in an instruction space of N valid instructions. For example, the rules can include symbolic Boolean equations of different instruction fields. The formal solver 204 can support declarative representation of the rules, which can allow defining separable rules such that an intersection of all the valid rules can be in the valid instruction space. As an example, a first rule may specify the condition field 414 to be "000000," and the flag2 field 412 to be "1." The first rule can be used to generate the instructions 400a or 400d based on the opcode field 408. Similarly, other rules may be defined, which can be used to generate other instructions in the instruction space.

In step 304, the method may include receiving a request to query the formal solver to solve for one or more valid instructions by crossing one or more instruction fields. As an example, the query may be received using a user interface. In certain examples, a user can select a variable or fields of the variable to cross using a GUI, an API interface, or another suitable user interface. For example, the user interface can allow the user to select the variables or different fields of a variable to cross for exhaustive coverage, sparse coverage, or targeted coverage. Crossing the one or more instruction fields to query the formal solver 204 may provide all valid combinations of the one or more instruction fields that are supported by the architectural specification of the processor. As an example, referring back to FIG. 4, the query may include crossing all the bits of the opcode field 408.

In step 306, the method may include querying the formal solver to solve the formal instruction model for all the combinations of the crossed instruction fields. The formal solver 204 may solve the formal model 206 for all the combinations of the crossed instruction fields. Solving the formal model 206 may imply that the formal solver 204 can find a combination of the one or more instruction fields that satisfy the rules. For example, the enumerator 202 may query the formal solver 204 to solve the formal model 206 for all the combinations of the 6 bits of the opcode field 408 (e.g., bits [55:50] of the instruction 400).

In step 308, the method may include determining whether a proof exists from querying the formal solver. The enumerator 202 may determine whether a proof exists based on an output of the formal solver 204 in response to the query. In some examples, the formal solver 204 may display or print the valid instruction, or that a proof has been obtained.

In step 310, the method may finish executing if a proof has been obtained in step 308. In some examples, the formal model 206 may not find a valid instruction for any combination of the crossed instruction fields and output a proof. An exhaustive proof can be obtained in the absence of a valid solution or when no new solutions have been found. In some examples, the method may go back to the step 304 and wait for another user query to cross different instruction fields.

In step 312, the method may include receiving a valid instruction from the formal solver from a solve of the formal instruction model for a combination of the crossed instruction fields. The enumerator 202 may receive a first valid instruction from the formal solver 204 from a first solve of the formal model 206. The first valid instruction may comprise a first combination of the one or more instruction fields. As an example, the formal solver 204 may generate the instruction 400c from the valid instruction space of N instructions from the first solve of the formal model 206. The enumerator 202 may receive the combination "000111" for the 6 bits of the opcode field 408 for the instruction 400c.

In step 314, the method may include recording values of the crossed instruction fields for the combination. The enumerator 202 may record the solved values of the first valid combination of the one or more instruction fields to provide the enumerated coverage points. For example, the enumerator 202 may record the value of the opcode field 408, e.g., "000111," which can be used to provide the enumerated coverage points. Herein, recording the values may indicate storing the values using any suitable data structure.

In step 316, the method may include incrementing a count of the valid instructions by one. The enumerator 202 may increment an internal counter to keep track of the number of valid solutions for each query. The internal counter can be defined and initialized in step 302 or at reset. For example, the internal counter can be initialized to zero and incremented to one after the first valid solve. Other implementations of the counter are possible. The counter can be used to provide a running total of the valid solutions found. In certain examples, if the count of the valid solutions is more than a certain threshold, the query can be terminated.

In step 318, the method may include updating the formal instruction model by adding a rule to invalidate the recorded values for subsequent solves of the formal instruction model. The enumerator 202 may update the formal model 206 by adding a new rule to invalidate the recorded values for subsequent solves of the formal model 206 for other combinations of the crossed instruction fields. The recorded values of the first combination are invalidated so that the subsequent solves do not produce the first valid instruction. For example, the enumerator 202 may update the formal model 206 by adding a new rule (e.g., the opcode field 408 !="000111") to invalidate the recorded value "000111" of the opcode field 408 so that the formal model 206 doesn't solve for the instruction 400c for the subsequent solves of the same query.

In step 320, the method may include determining whether the proof is exhaustive, or the query has been terminated. The enumerator 202 may determine whether an exhaustive proof has been obtained based on the output of the formal solver 204 in response to the query. The enumerator 202 may determine whether the query has been terminated via the user interface. If the exhaustive proof has not been obtained or the query has not been terminated, the enumerator 202 may continue querying the formal solver 204 to solve the formal model 206 for another valid instruction in the step 306. In the second iteration, the updated rules may block solving for the first valid instruction, and the formal solver 204 may solve the formal model 206 for a second valid instruction for a second combination of the one or more instruction fields. For example, the recorded values "000111" of the opcode field 408 may be disabled, and the formal model 206 may generate the instruction 400e by solving for the value "010110" of the opcode field 408. The enumerator 202 may record the values "010110" of the opcode field 408, which can be used to provide the enumerated coverage points. The counter can be incremented to two after the second valid solve. The enumerator 202 may update the formal model 206 by adding a new rule (e.g., the opcode field 408 !="010110") to invalidate the recorded value "010110" of the opcode field 408 so that the formal model 206 doesn't solve for the instruction 400e for the subsequent solves of the same query.

The enumerator 202 may continue querying the formal solver 204 to solve the formal model 206 for different valid instructions iteratively until no more valid instructions are found or the query is terminated. Thus, as shown in FIG. 3, the steps 306-320 can be repeated for each valid solve until all the valid instructions have been found or the query has been terminated. The counter can continue incrementing the count of the valid instructions and can provide a running total of the valid instructions found at a point in time. For example, the enumerator 202 can provide the enumerated coverage points 208 based on a count of the valid instructions to the user using the user interface.

In step 322, the method may include processing the query results upon determining that the exhaustive proof has been obtained, or the query has been terminated. The enumerator 202 may process the query results by generating an exhaustive list of all the valid combinations that were recorded in the step 314. The enumerator 202 may further convert the recorded values to individual coverage bins to provide the enumerated coverage points 208 that represent the exhaustive coverage of the query. The enumerated coverage points 208 can be exported to SystemVerilog® or another verification environment to generate the stimulus 210, which can be used to determine if sufficient simulation has been performed on the DUT 102. For example, the enumerated coverage points 208 can be used to test certain features or components of the processor for all the valid instructions generated using the method 300. In certain embodiments, the enumerated coverage points 208 can be used to validate certain properties of a group of instructions based on the rules specified in the formal instruction model.

If the query was terminated due to unacceptable number of solutions or elapsed time, another query can be started by crossing a smaller number of instruction fields. In another example, if the exhaustive coverage was not achieved, different solutions can be found by crossing the condition field 414 with the opcode field 408, or the condition field 414 with the flag2 412 field and the flag1 field 410. Note that crossing all the fields of the instruction 400 can provide exhaustive coverage for the whole instruction; however, the elapsed time for the query may be too long.

In certain embodiments, the enumerator 202 can define local variables in the testbench 200 to partition the valid space into more manageable sized crosses so that exhaustive coverage can be obtained. These can be created by iteratively writing a coverage query, solving and then aborting the query process if a timeout occurs, and then creating new local variables and running again by leveraging the cross to use the local variables until a proof converges.

Figure 5:
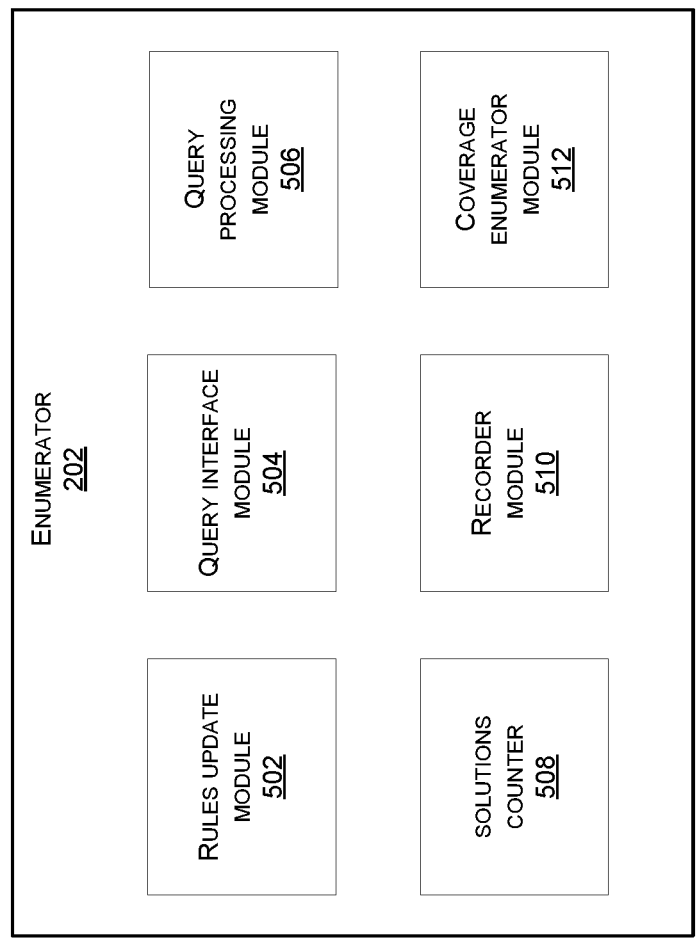
FIG. 5 illustrates a block diagram of the enumerator, which can be used to enumerate coverage points for design verification of the DUT, in certain embodiments.

FIG. 5 illustrates a block diagram 500 of the enumerator 202 which can be used to enumerate coverage points for design verification of a DUT, in certain embodiments.

An example implementation of the enumerator 202 may include modules comprising a rules update module 502, a query interface module 504, a query processing module 506, a solutions counter 508, a recorder module 510, and a coverage enumerator module 512. Functionality of the enumerator 202 may be implemented using program code which can be executed by a processor. For example, the program code may be stored in a computer readable medium in the form of the instructions. In certain embodiments, the program code for the enumerator 202 can be embedded in or passed onto the formal verification testbench 200 using an API to interact with the formal solver 204.

The rules update module 502 can be used to provide the formal model 206 with the rules to the formal solver 204 and update the rules in the formal model 206. The rules can be expressed as symbolic Boolean equations of variables based on the architectural specification of the DUT 102. For example, the rules can be specified for generating valid instructions in an instruction space of the processor. The rules can be expressed using symbolic Boolean equations of instruction fields based on the instruction-set architecture of the processor and can be used to generate valid instructions. In some examples, sequential rules can be specified to validate whether a group of instructions (e.g., instructions A, B, and C) follow a certain sequence (e.g., an instruction A cannot happen before an instruction B). The rules update module 502 can be used to update the formal model 206 after each valid solve to invalidate the recorded values of the crossed variables for the subsequent solves of the crossed variables. In certain embodiments, the rules update module 502 may add a new rule after each valid solve to update the rules. As an example, after 100 valid solves, 100 new rules may be added to the formal model 206 by the rules update module 502. The declarative representation of the rules can allow an intersection of all the separable rules to be in a valid solution space.

The query interface module 504 may be used to receive a request to query the formal solver for all combinations of one or more fields of the variable. For example, the query interface module 504 may be used to receive a request to query the formal solver 204 to solve the formal model 206 for all the combinations of the one or more instruction fields. An example request for a second query may include producing all combinations of the instructions A, B, and C, where each instruction is used once. The request for the query may be received using a user interface, which may include a GUI, an API, or another suitable interface. In certain examples, the user interface can be part of the formal verification testbench 200. For example, the GUI can allow a user to select the variables or different fields of a variable to cross to obtain exhaustive coverage, sparse coverage, or targeted coverage of the DUT 102. In certain examples, the query interface module 504 may also be used to receive a request via the user interface to terminate a query. For example, in some instances, the query may be terminated due to unacceptable number of solutions or elapsed time, and a new query with different variables can be initiated. In certain examples, the user interface can allow entering a specific number of solutions or a specific time period, after which the query can be terminated or time-out. In certain embodiments, the request for the query can be generated automatically using an ML interface based on certain heuristics, or other criteria. The variable for the query can be crossed in a controlled manner to control the coverage points, for example, in order to steer the stimulus for testing certain aspects of the design.

The query processing module 506 may be used to determine whether a proof has been obtained by querying the formal solver 204. If the proof has not been obtained, the query processing module 506 may continue querying the formal solver 204 iteratively for all the combinations of the crossed variables until a proof is obtained. A proof can be obtained when no more valid solutions are available. As an example, an exhaustive coverage for the second query can provide three valid combinations which do not include instruction A before instruction B. For example, the valid combinations may include {B,A,C}, {B,C,A}, and {C,B,A}. The query processing module 506 may also determine if a proof is for an exhaustive coverage (e.g., all the possible valid solutions have been found), or sparse coverage (e.g., only a portion of the valid solutions have been found). For example, as discussed with reference to step 320 in FIG. 3, the query processing module 506 may determine whether the exhaustive proof has been obtained so that the solve process can exit or continue iteratively until a proof is obtained.

The solutions counter 508 may include a counter to keep a count of the valid solutions generated by the formal solver 204 for each user query. The counter can be incremented after each valid solve. As discussed with reference to the step 316 in FIG. 3, the solutions counter 508 can provide a real time count of the valid solutions found. After a proof is obtained, value of the solutions counter 508 may indicate the total number of valid coverage points for a given query. The solutions counter 508 can be initialized at reset or before processing a new query.

The recorder module 510 may be used to record values of each combination of the one or more fields of the variable that resulted in a respective valid solution. For example, the recorder module 510 may be used to record values of each valid combination of the one or more instruction fields that resulted in a valid instruction.

The coverage enumerator module 512 can be used to generate the enumerated valid coverage points for the DUT. The coverage enumerator module 512 may process results of the query to convert the recorded values as the enumerated coverage points 208. In certain embodiments, the recorded values for all the valid solutions can be converted to individual coverage bins that may represent the exhaustive coverage of the query. The recorded values for all the valid solutions can be exported to provide the enumerated coverage points 208 that can be used to generate the stimulus 210 to test the DUT 102 in any suitable simulation environment. In certain examples, the enumerated coverage points 208 can be used to verify coverage of a compiler used for generating the valid instructions for the processor.

Figure 6:
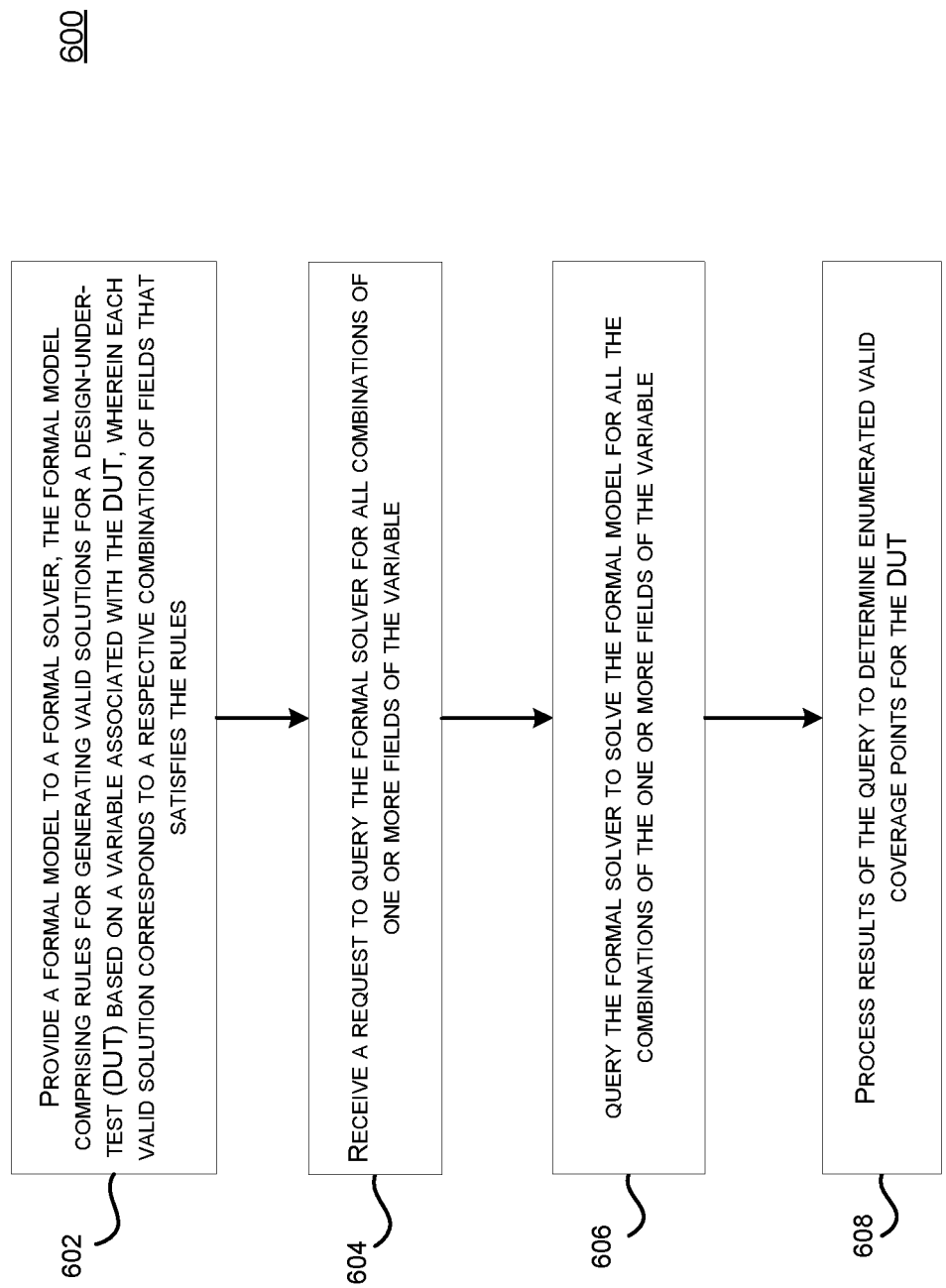
FIG. 6 illustrates a flow chart for a method to provide enumerated coverage points for the DUT, in certain embodiments.

FIG. 6 illustrates a flow chart 600 for a method to provide enumerated coverage points for a DUT, in certain embodiments. The method may be executed by the enumerator 202 in the formal verification testbench 200 using the formal solver 204 and the formal model 206, as discussed with reference to FIG. 2.

In step 602, the enumerator 202 may provide a formal model to a formal solver. The formal model may include rules for generating valid solutions for the DUT 102 based on a variable associated with the DUT 102. Each valid solution may correspond to a respective combination of fields of the variable that satisfies the rules. The rules may include symbolic Boolean equations of the fields of the variable for generating the valid solutions in a solution space based on an architectural specification of the DUT 102. For example, the rules update module 502 in the enumerator 202 may provide the formal model 206 with the rules to the formal solver 204 for generating valid instructions in an instruction space of the processor based on one or more instruction fields.

In step 604, the enumerator 202 may receive a request to query the formal solver for all combinations of one or more fields of the variable. The query interface module 504 may receive a request to query the formal solver 204 for all combinations of the one or more instruction fields. The query may be received using a suitable user interface or can be generated automatically using an ML interface.

In step 606, the enumerator 202 may query the formal solver to solve the formal model for all the combinations of the one or more fields of the variable. For example, the query processing module 506 may continue querying the formal solver 204 to solve the formal model 206 iteratively for all the combinations of the crossed variables until a proof is obtained. A proof is obtained, when no valid solutions exist, or the exhaustive coverage has been obtained. The recorder module 510 may be used to record values of each combination of the one or more fields of the variable that resulted in a respective valid solution. The solutions counter 508 may be incremented after each valid solve. The rules update module 502 can also be used to update the formal model 206 by adding one or more rules after each valid solve to invalidate the recorded values of the crossed variables for the subsequent solves of the crossed variables.

In step 608, the enumerator 202 may process results of the query to determine enumerated valid coverage points for the DUT. The coverage enumerator module 512 can be used to process the results of the query by converting the recorded values for each valid combination of the one or more fields of the variable resulting in the valid solution to individual coverage bins. The individual coverage bins can be exported as the enumerated valid coverage points that represent the exhaustive coverage of the query. The enumerated valid coverage points 208 can be used to generate test cases to perform simulations on the DUT 102, or a system using the DUT 102.

As discussed with reference to FIGS. 2-6, certain embodiments can provide the flexibility of querying on any field within the solution space of a DUT to enumerate on. Additionally, the same set of rules that are based on the architectural specification of the DUT can be used to generate the enumerated coverage points as well as the stimulus. Using the same flow for the stimulus generation and the coverage points generation can minimize the use of resources as well as accelerate the design verification cycle. Certain embodiments can be used to provide enumerated coverage points for one or more components of a computing device discussed with reference to FIG. 7.

Figure 7:
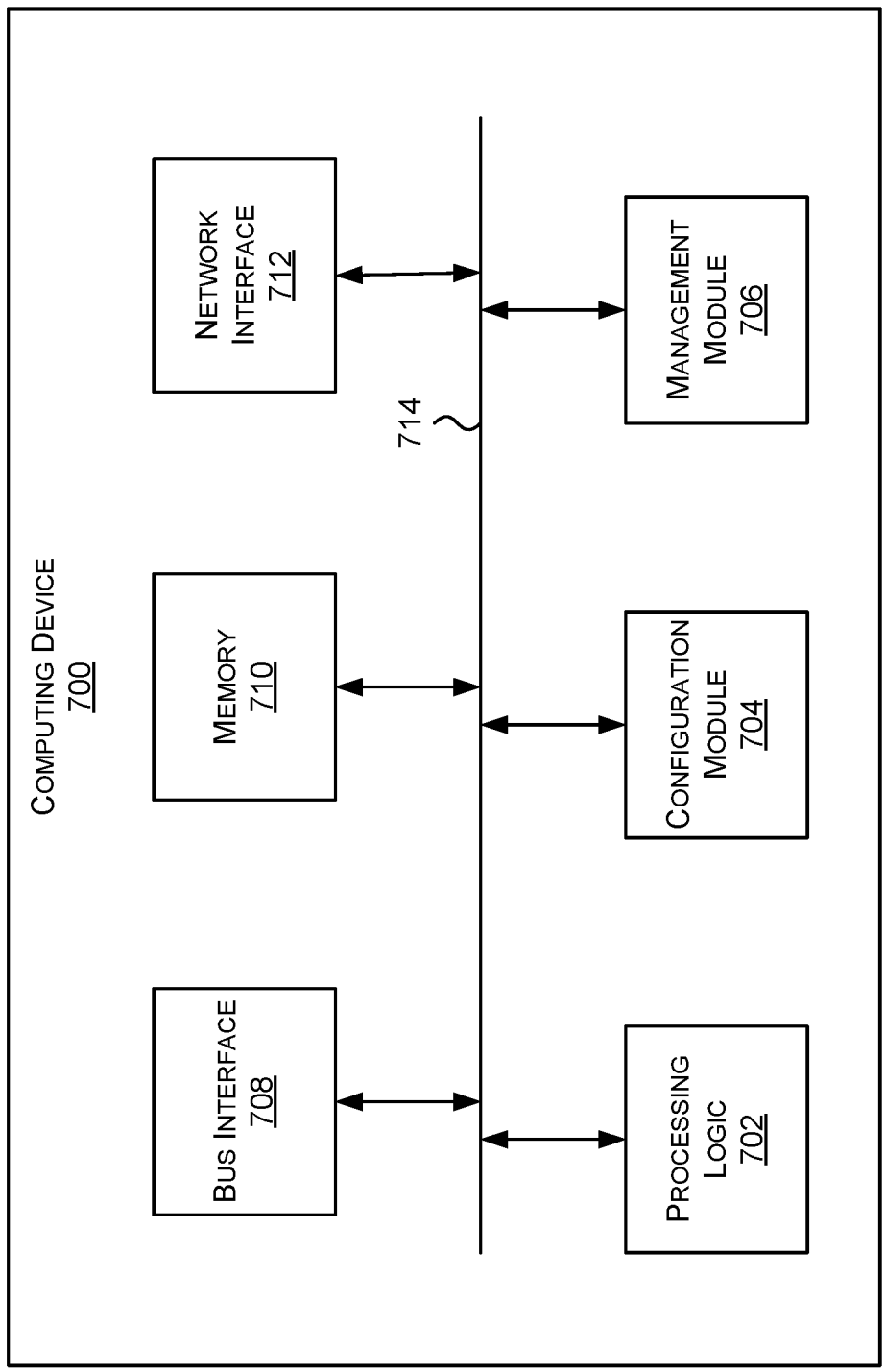
FIG. 7 illustrates an example of a computing device, according to certain aspects of the disclosure.

FIG. 7 illustrates an example of a computing device 700. Functionality and/or several components of the computing device 700 may be used without limitation with other embodiments disclosed elsewhere in this disclosure, without limitations.

In one example, the computing device 700 may include processing logic 702, a configuration module 704, a management module 706, a bus interface module 708, memory 710, and a network interface module 712. These modules may be hardware modules, software modules, or a combination of hardware and software. In certain instances, modules may be interchangeably used with components or engines, without deviating from the scope of the disclosure. In some implementations, the computing device 700 may include fewer modules. In some implementations, one or more of the modules may be combined into one module. One or more of the modules may be in communication with each other over a communication channel 714. The communication channel 714 may include one or more busses, meshes, matrices, fabrics, a combination of these communication channels, or some other suitable communication channel.

The processing logic 702 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 702 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 702 may be stored on a computer-readable storage medium, for example, in the form of a computer program. The computer-readable storage medium may be non-transitory. In some cases, the computer-readable medium may be part of the memory 710.

The memory 710 may include either volatile or non-volatile, or both volatile and non-volatile types of memory. The memory 710 may, for example, include random access memory (RAM), read only memory (ROM), Electrically Erasable Programmable Read-Only Memory (EEPROM), flash memory, and/or some other suitable storage media. In some cases, some or all of the memory 710 may be internal to the computing device 700, while in other cases some or all of the memory may be external to the computing device 700. The memory 710 may store an operating system comprising executable instructions that, when executed by the processing logic 702, provides the execution environment for executing instructions providing networking functionality for the computing device 700. The memory may also store and maintain several data structures and routing tables for facilitating the functionality of the computing device 700.

In some implementations, the configuration module 704 may include one or more configuration registers. Configuration registers may control the operations of the computing device 700. In some implementations, one or more bits in the configuration register can represent certain capabilities of the computing device 700. Configuration registers may be programmed by instructions executing in the processing logic 702, and/or by an external entity, such as a host device, an operating system executing on a host device, and/or a remote device. The configuration module 704 may further include hardware and/or software that control the operations of the computing device 700.

In some implementations, the management module 706 may be configured to manage different components of the computing device 700. In some cases, the management module 706 may configure one or more bits in one or more configuration registers at power up, to enable or disable certain capabilities of the computing device 700. In certain implementations, the management module 706 may use processing resources from the processing logic 702. In other implementations, the management module 706 may have processing logic similar to the processing logic 702, but segmented away or implemented on a different power plane than the processing logic 702.

The bus interface module 708 may enable communication with external entities, such as a host device and/or other components in a computing system, over an external communication medium. The bus interface module 708 may include a physical interface for connecting to a cable, socket, port, or other connection to the external communication medium. The bus interface module 708 may further include hardware and/or software to manage incoming and outgoing transactions. The bus interface module 708 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 708 may include the physical layer for any of these bus protocols, including a connector, power management, and error handling, among other things. In some implementations, the computing device 700 may include multiple bus interface modules for communicating with multiple external entities. These multiple bus interface modules may implement the same local bus protocol, different local bus protocols, or a combination of the same and different bus protocols.

The network interface module 712 may include hardware and/or software for communicating with a network. This network interface module 712 may, for example, include physical connectors or physical ports for wired connection to a network, and/or antennas for wireless communication to a network. The network interface module 712 may further include hardware and/or software configured to implement a network protocol stack. The network interface module 712 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 700 may include multiple network interface modules, each configured to communicate with a different network. For example, in these implementations, the computing device 700 may include a network interface module for communicating with a wired Ethernet network, a wireless 802.11 network, a cellular network, an Infiniband network, etc.

The various components and modules of the computing device 700, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 7, FIG. $$$, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method, comprising:
   providing a formal model to a formal solver, the formal model comprising rules for generating valid solutions for a design-under-test (DUT) based on a variable associated with the DUT, wherein each valid solution corresponds to a respective combination of fields of the variable that satisfies the rules;

receiving a request to query the formal solver for all combinations of one or more fields of the variable;

querying the formal solver to solve the formal model for all the combinations of the one or more fields of the variable, wherein querying the formal solver includes:
　receiving, from the formal solver, a valid solution for the DUT;
　recording the valid solution for the DUT; and
　adding, to the formal model, a rule that invalidates the recorded valid solution for the DUT in subsequent solves of the formal model; and processing results of the query to determine enumerated valid coverage points for the DUT.

2. The computer-implemented method of claim 1, wherein querying the formal solver includes,
　for each combination of the one or more fields of the variable of all the combinations of the one or more fields of the variable:
　　determining whether solving the formal model for the combination of the one or more fields of the variable results in a proof,
　　receiving, upon determining that solving the formal model for the combination of the one or more fields of the variable does not result in the proof, from the formal solver, a valid solution comprising the combination of the one or more fields of the variable;
　　recording values of the one or more fields of the variable for the combination;
　　incrementing a count of the valid solutions; and
　　updating the formal model by adding a rule to invalidate the recorded values for the combination for subsequent solves of the formal model.

3. The computer-implemented method of claim 2, further comprising:
　receiving a request to terminate the query, wherein the query is terminated when the count of the valid solutions is greater than a threshold value.

4. The computer-implemented method of claim 3, wherein the one or more fields of the variable include a first set of fields of the variable, the method further comprising:
　receiving a new request to query the formal solver for all combinations of a second set of fields of the variable;
　querying the formal solver to solve the formal model for all the combinations of the second set of fields of the variable; and
　processing the results of the query to provide the enumerated valid coverage points for the DUT.

5. The computer-implemented method of claim 2, wherein processing the results of the query includes:
　converting the recorded values for each combination of the one or more fields of the variable resulting in the valid solution to individual coverage bins; and
　providing the individual coverage bins as the enumerated valid coverage points.

6. The computer-implemented method of claim 5, further comprising:
　providing, for each combination of the one or more fields of the variable resulting in the valid solution, the count of the valid solutions in real time for the enumerated valid coverage points.

7. The computer-implemented method of claim 5, wherein the individual coverage bins represent exhaustive coverage of the query, the method further comprising:
　exporting the enumerated valid coverage points to generate stimulus to perform simulations on the DUT.

8. The computer-implemented method of claim 7, wherein the request for the query is generated automatically using a machine learning (ML) interface to control the variable for targeted stimulus.

9. The computer-implemented method of claim 2, wherein determining that solving the formal model for a given combination of the one or more fields of the variable results in the proof indicates that no additional valid solutions exist.

10. The computer-implemented method of claim 1, wherein the rules include symbolic Boolean equations of the fields of the variable for generating the valid solutions in a solution space based on an architectural specification of the DUT.

11. The computer-implemented method of claim 1, wherein the formal model is implemented as a state space model comprising valid and invalid states of the DUT based on an architectural specification of the DUT.

12. The computer-implemented method of claim 1, wherein the formal model includes a formal instruction model based on an instruction-set architecture of a processor, and the variable includes one or more instruction fields, and wherein the request is to query the formal solver for all valid combinations of the one or more instruction fields.

13. A non-transitory computer readable medium having stored therein instructions that, when executed by one or more processors, cause the one or more processors to execute a method comprising:
　providing a formal model to a formal solver, the formal model comprising rules for generating valid solutions for a design-under-test (DUT) based on a variable associated with the DUT, wherein each valid solution corresponds to a respective combination of fields of the variable that satisfies the rules;
　receiving a request to query the formal solver for all combinations of one or more fields of the variable;
　querying the formal solver to solve the formal model for all the combinations of the one or more fields of the variable, wherein querying the formal solver includes:
　　receiving, from the formal solver, a valid solution for the DUT;
　　recording the valid solution for the DUT; and
　　adding, to the formal model, a rule that invalidates the recorded valid solution for the DUT in subsequent solves of the formal model; and
　processing results of the query to determine enumerated valid coverage points for the DUT.

14. The non-transitory computer readable medium of claim 13, wherein querying the formal solver includes,
　for each combination of the one or more fields of the variable of all the combinations of the one or more fields of the variable:
　　determining whether solving the formal model for the combination of the one or more fields of the variable results in a proof,
　　receiving, upon determining that solving the formal model for the combination of the one or more fields of the variable does not result in the proof, from the formal solver, a valid solution comprising the combination of the one or more fields of the variable;
　　recording values of the one or more fields of the variable for the combination;
　　incrementing a count of the valid solutions; and
　　updating the formal model by adding a rule to invalidate the recorded values for the combination for subsequent solves of the formal model.

15. The non-transitory computer readable medium of claim 13, wherein the method is executed by an enumerator in a formal verification testbench using the formal solver and the formal model.

16. The non-transitory computer readable medium of claim 13, wherein the query is received using an application programming interface (API).

* * * * *